Sept. 18, 1962 D. M. BARTON ETAL 3,054,653
METHOD OF REMOVING ACIDIC ORGANIC CONSTITUENTS FROM GASES
Filed Dec. 31, 1959
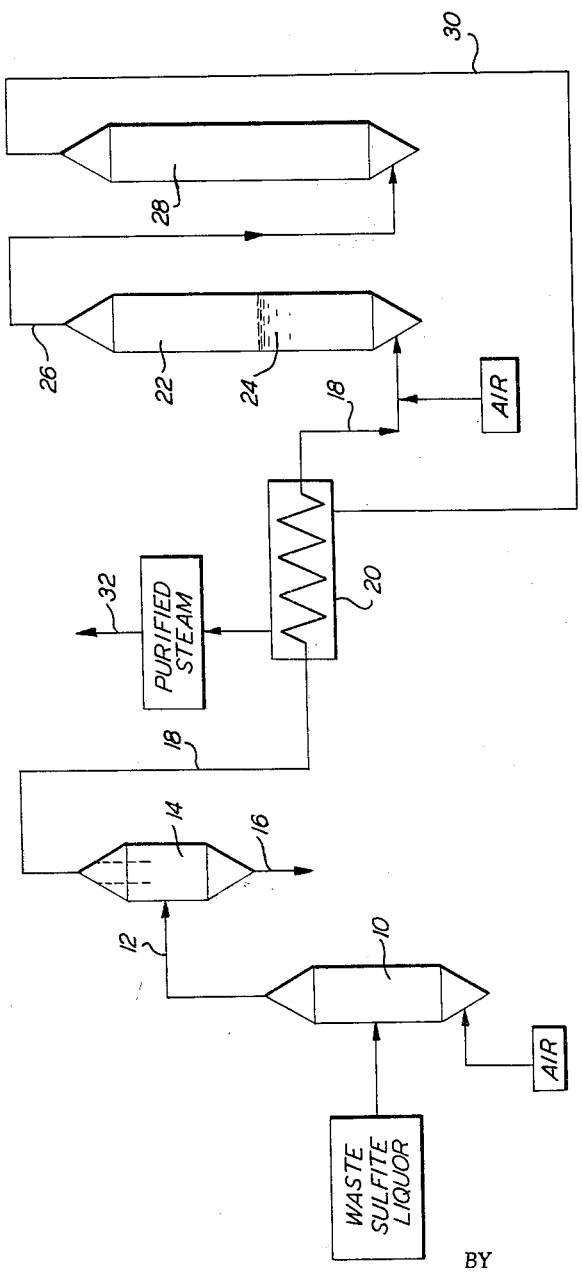
INVENTORS.
EUGENE W. SCHOEFFEL
DANIEL M. BARTON
BY Dean Laurence
ATTORNEY

United States Patent Office 3,054,653
Patented Sept. 18, 1962

3,054,653
METHOD OF REMOVING ACIDIC ORGANIC
CONSTITUENTS FROM GASES
Daniel Martin Barton and Eugene Wilhelm Schoeffel, Rothschild, Wis., assignor to Sterling Drug Inc., New York, N.Y., a corporation of Delaware
Filed Dec. 31, 1959, Ser. No. 863,163
7 Claims. (Cl. 23—2)

The present invention relates to the purification of vapors and gases. More particularly, the present invention relates to the removal of organic impurities from steam.

In United States Patent 2,665,249 to Zimmermann, there is disclosed a process for wet-air oxidation of woodpulping liquors and other industrial waste aqueous dispersions containing organic materials, whereby substantially all of the organic material in such solution is converted to carbon dioxide and water. The process is exothermic and results in the production of a substantial amount of useful high pressure steam, mixed with such relatively non-condensible gases as carbon dioxide, nitrogen, oxygen, and some volatilized organic compounds. The organic constituents present in the steam are acidic in nature with acetic acid as the major component. Among the other difficultly oxidizable organic compounds present are formic acid, phenols, aromatic and other acid substances and minute amounts of alcohols, aldehydes, ketones, and aromatic and aliphatic compounds.

The presence of organic acids in the steam at the high temperature at which it is obtained is industrially undesirable because they corrode metal equipment such as turbines, heat-exchangers, et cetera, in which the steam may be employed. The high temperatures and pressures tend to amplify the corrosive action of the acids.

The present invention resides in the concept of a process for purifying steam contaminated with corrosive and otherwise undesired volatilized organic substances which includes introducing a mixture of steam and volatilized organic substances and an oxygen-containing gas into an aqueous dispersion of an alkaline scrubbing agent in a reaction zone maintained above about 150 degrees centigrade and under superatmospheric pressure. The volatilized organic substances combine chemically with the alkaline scrubbing agent to form relatively non-volatile salts that are retained in the reaction zone and the purified steam passes through. As impure steam is continuously passed into the reaction zone, the concentration of the relatively non-volatile salts formed by the reaction in the scrubbing liquid builds up to the point where the self-sustained oxidation of these products occurs. The oxygen being passed into the reaction zone reacts with the salts to regenerate the alkaline scrubbing agent and to form combustion products including carbon dioxide and water. The regenerated alkaline scrubbing agent is thus available to remove organic substances from succeeding portions of impure steam.

The temperature in the scrubbing and oxidation zone should be maintained between about 150 degrees centigrade and the critical temperature of water, 374 degrees centigrade. Since the oxidation reaction is exothermic, the reaction itself normally supplies sufficient heat to maintain combustion temperature. The pressure in the scrubbing and oxidation zone is the vapor pressure of the reactants at the temperature employed and can vary between about 100 pounds per square inch and about 6000 pounds per square inch. An oxidation catalyst can be employed to lower the temperature at which oxidation of the salt products in the reaction zone commences.

The term "alkaline scrubbing agent," as used herein, means a water-soluble substance capable of reacting with the volatilized organic impurities in the impure steam to form relatively non-volatile liquid or solid products, usually salts of the acids, that remain in the scrubbing agent for oxidation. Among the scrubbing agents which can be employed are aqueous solutions of alkaline compounds of alkali metals which react with and remove from the gas the organic components of the gas to be purified. The hydroxides and carbonates of the alkali metals such as sodium hydroxide, potassium hydroxide, lithium hydroxide, sodium carbonate, potassium carbonate, and lithium carbonate may be used. Potassium carbonate is the preferred scrubbing agent because of its relatively high water solubility at elevated temperatures.

The term "oxidation catalyst," as used herein, means a substance capable of catalyzing the oxidation of the organic combustibles concentrated in the alkaline scrubbing agent. Among the catalysts which can be employed are the following: the noble metals, the heavy metals and the iron group metals; and the oxides, phosphates and acetates of said metals such as silver, mercury, cobalt, chromium, vanadium, manganese, and copper. When the elemental metals are employed, they can be used in the form of metallic dusts. The preferred catalyst is a mixture of silver oxide and manganese dioxide. In addition, the catalyst forms temporary addition products with alkaline impurity substances such as pyridine and other nitrogen bases. Thus, the oxidation catalyst increases the extent of combustion of alkaline substances by scrubbing the alkaline substances from the impure steam.

It is thus a primary object of the invention to provide a process for removing volatilized organic impurities from steam.

It is a further object of the invention to provide a process for scrubbing volatilized organic impurities from impure steam and oxidizing the impurities with simultaneous regeneration of the scrubbing agent.

It is a further object of the invention to provide a process for concentrating the dilute impurities from impure steam to a point such that the impurities can be oxidized autogenetically.

Further objects and advantages of the invention will become apparent upon a reading of the following illustration of the best mode contemplated for carrying out the invention. While the invention will be hereinafter illustrated with reference to waste sulphite liquor treated by the Zimmermann process, it is equally applicable to the gaseous effluent from the oxidation of other pulping wastes, industrial wastes in general, and chemical plant residues, which effluents contain corrosive organic acids or other undesired organic compounds as discussed hereinbefore.

In the drawing, the single FIGURE is a schematic representation, in elevation, of one form of apparatus suitable for practicing the invention.

Employing apparatus diagrammatically illustrated in the attached drawing, the process can be continuously carried out as follows: Introduce a mixture of air and waste sulfite pulping liquor into an oxidizer 10. Oxidize the liquor according to the procedure set forth in United States Patent 2,665,249 at a temperature of about 250 degrees centigrade. Withdraw effluent from the oxidation zone through a pipe 12 and pass it in to a separator 14. Withdraw the liquid and solid phases from the separator through a pipe 16. Withdraw the gaseous phase, comprising steam; relatively non-condensible gases; and volatile organic impurities from the separator through a pipe 18.

Preheat the gases by passing them through a heat exchanger 20, wherein heat from previously purified steam heats the incoming gases. Fill the lower half of a scrubber-oxidizer 22 with an aqueous solution 24 of potassium carbonate having an initial concentration of about 350 grams per liter. Mix air with the preheated gases and pass the mixture into the scrubber-oxidizer 22. At the bottom of the scrubber-oxidizer 22, the gases have a temperature of about 285 degrees centigrade. Air or enriched oxygen-containing gas is passed into line 18 at a rate that will furnish at least the stoichiometric equivalent of oxygen required to combine with the oxidizable material in the scrubbing liquid. An excess of five percent of oxygen is preferred to insure substantially complete oxidation of organic compounds and the oxidation of any catalyst that may have been reduced in the course of oxidation.

The organic impurities are scrubbed from the impure gas by reactions such as the following:

$$K_2CO_3 + 2CH_3COOH \rightarrow 2CH_3COOK + H_2O + CO_2$$

The oxidation of the potassium acetate and continuous regeneration of the potassium carbonate scrubbing agent is represented by the following chemical equation:

$$2CH_3COOK + O_2 \rightarrow K_2CO_3 + 3CO_2 + 3H_2O$$

Withdraw the purified mixture of steam and relatively non-condensible gases from the top of scrubber-oxidizer 22 through a pipe 26. Pass the mixture of gases into the bottom of a water-filled washer 28. The temperature of the gas mixture at the top of the scrubber-oxidizer 22 and the bottom of the washer 28 is about 332 degrees centigrade. In the washer 28, alkaline materials are washed from the gases. Withdraw the purified gas mixture, at a temperature of about 294 degrees centigrade, from the top of the washer 28 and pass the mixture through a line 30 to heat exchanger 20. After giving up some of its energy in the heat exchanger 20, the purified mixture of steam and relatively non-condensible gases is withdrawn from the system through a pipe 32 and can be employed for power as in steam turbines.

As mentioned above, a catalyst can be added to the aqueous potassium carbonate solution 24 present in reactor 22. A particularly effective catalyst, for example, has been found to contain 25 to 100 grams per liter of a mixture of silver oxide and manganese dioxide. Such catalysts effectively accelerate the oxidation reactions taking place and modify the conditions at which the reaction becomes self-sustaining.

It will thus be seen that the invention provides a process for purifying steam by scrubbing the organic impurities from the steam to concentrate them, and then oxidizing the impurities with regeneration of the scrubbing agent in situ. While the approach of this invention is ideally suited for removing difficultly oxidizable impurities present in steam produced by wet oxidation processes, such as the Zimmermann process, it may also be utilized for the removal of organic impurities present in steam arising from other sources.

The invention can be embodied in other specific forms without departing from the spirit or essential characteristics thereof. The described physical embodiment is therefore to be considered in all respects illustrative and not restrictive. The scope of the invention is indicated by the subjoined claims rather than by the foregoing description. All changes which come within the meaning and range of equivalency of the claims are therefore intended to be embraced therein.

We claim:

1. A process for purifying steam containing volatilized acidic organic impurities which includes: continuously passing said steam and an oxygen-containing gas into an aqueous solution of an alkali metal compound selected from the group consisting of alkali metal hydroxide and alkali metal carbonate, said aqueous solution being maintained at a temperature from about 150 to 374 degrees centigrade and under the vapor pressure of the reactants at the temperature employed, thereby oxidizing said organic impurities to carbon dioxide and water, the thus formed carbonate of the said alkali metal being continuously regenerated in situ.

2. A process for destroying volatilized acidic organic constituents of wet air oxidation effluent gases which includes: continuously introducing an oxygen-containing gas and said effluent gases into an aqueous solution of an alkali metal compound selected from the group consisting of alkali metal hydroxide and alkali metal carbonate said aqueous solution being maintained at a temperature from about 150 to 374 degrees centigrade and under the vapor pressure of the reactants at the temperature employed, thereby to convert the said organic substituents in said gases to their salt form and oxidize said salts to carbon dioxide and water, the thus formed carbonate of the said alkali metal being continuously regenerated in situ.

3. A process as set forth in claim 1 wherein an oxidation catalyst is mixed with the said alkali metal compound.

4. A process as set forth in claim 1 wherein the said alkali metal compound is potassium carbonate.

5. A process for destroying volatilized acidic organic constituents of wet air oxidation effluent gases which includes: continuously passing an oxygen-containing gas and said effluent gases through an aqueous solution of an alkali metal compound selected from the group consisting of alkali metal hydroxide and alkali metal carbonate whereby said alkali metal compound combines with said organic constituents to form salts and to enhance the concentration of the organic constituents in said solution of alkali metal compound; maintaining said mixture at a temperature from about 150 to 374 degrees centigrade and under the vapor pressure of the reactants at the temperature employed to oxidize the concentrated organic constituents to carbon dioxide and water and continuously regenerate the thus formed carbonate of the said alkali metal in situ.

6. A process as set forth in claim 4 and including the steps: withdrawing the purified effluent gases from the scrubbing and oxidizing zone; passing said effluent gases in indirect heat exchange relationship with the wet air oxidation effluent gases being fed to the scrubbing and oxidation zone.

7. In a process for removing difficulty oxidizable volatilized acidic organic constituents present in the vapors from the autogenous liquid phase oxidation of an aqueous dispersion of an organic industrial waste, the step of: passing said vapors and at least the stoichiometric equivalent quantity of oxygen thru an aqueous solution of potassium carbonate at a temperature from 150 to 374 degrees centigrade and under the vapor pressure of the named reactants at the temperature employed, thereby to convert said organic constituents in said vapors to salts and oxidize the organic component of said salts to carbon dioxide and water and regenerate the potassium carbonate in situ.

References Cited in the file of this patent

UNITED STATES PATENTS

| 1,854,428 | Segerfelt | Apr. 19, 1932 |
| 2,690,425 | Moses et al. | Sept. 28, 1954 |
| 2,944,396 | Barton et al. | July 12, 1960 |

FOREIGN PATENTS

| 137,388 | Great Britain | Jan. 15, 1920 |